United States Patent [19]

Ashkin et al.

[11] Patent Number: 4,748,575
[45] Date of Patent: May 31, 1988

[54] CIRCUIT FOR DETECTING TRAILING ZEROS IN NUMBERS

[75] Inventors: Peter B. Ashkin, Los Gatos; Andrew G. Heninger, Santa Clara, both of Calif.

[73] Assignee: Zilog, Inc., Campbell, Calif.

[21] Appl. No.: 684,600

[22] Filed: Dec. 21, 1984

[51] Int. Cl.$^4$ .............................................. G06F 7/38
[52] U.S. Cl. .................................................... 364/715
[58] Field of Search ............... 364/757, 760, 754, 736, 364/715, 758, 759, 748

[56] References Cited

U.S. PATENT DOCUMENTS

| | | | |
|---|---|---|---|
| 3,192,363 | 6/1965 | McSorley | 364/760 |
| 3,571,580 | 3/1971 | Buchan et al. | 364/715 |
| 4,276,607 | 6/1981 | Wong | 364/760 |

*Primary Examiner*—Gary V. Harkcom
*Assistant Examiner*—Tan V. Mai
*Attorney, Agent, or Firm*—Majestic, Gallagher, Parsons & Siebert

[57] ABSTRACT

A system for detecting the presence of trailing zeros in a number. The number is divided into a plurality of consecutive groups, each group having an address. The system also determines the address location of the lowest order group which contains at least one non-zero bit and which precedes any trailing zeros of the number. Such group defines a target group. The system includes a first circuit for dividing the number into a plurality of consecutive words where each word contains more bits than any group. The first circuit also determines the lowest order word which contains one or more non-zero bits and which precedes any trailing zeros of the number. The system includes a second dividing circuit for dividing each word into a plurality of segments each having a number of bits equal to or greater than the number of bits in the target group. The second dividing circuit determines, for each word, the lowest order segment which contains one or more non-zero bits and which precedes any trailing zeros of such word. The first and second dividing circuits perform the determination substantially simultaneously to reduce the amount of time for determining the address of the target. The system further includes circuit for determining, from the lowest order word and segment determined by the first and second dividing circuits, the address of the target group.

17 Claims, 2 Drawing Sheets

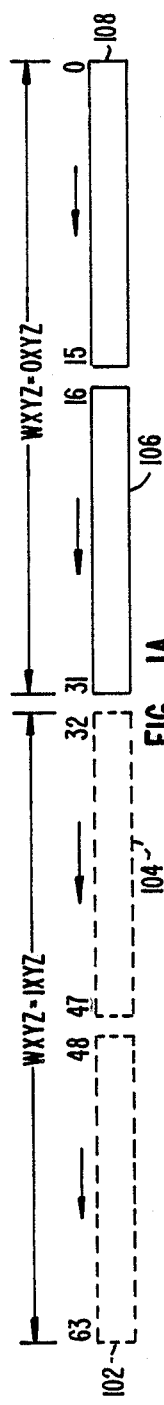
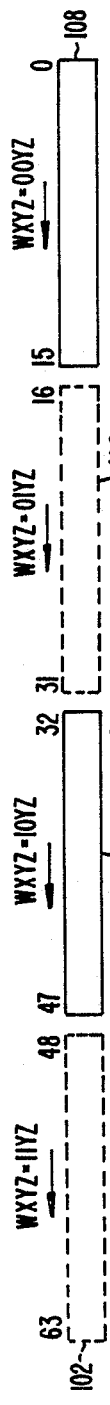
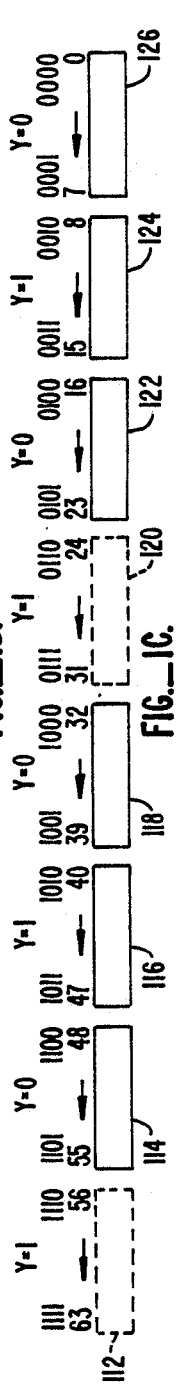
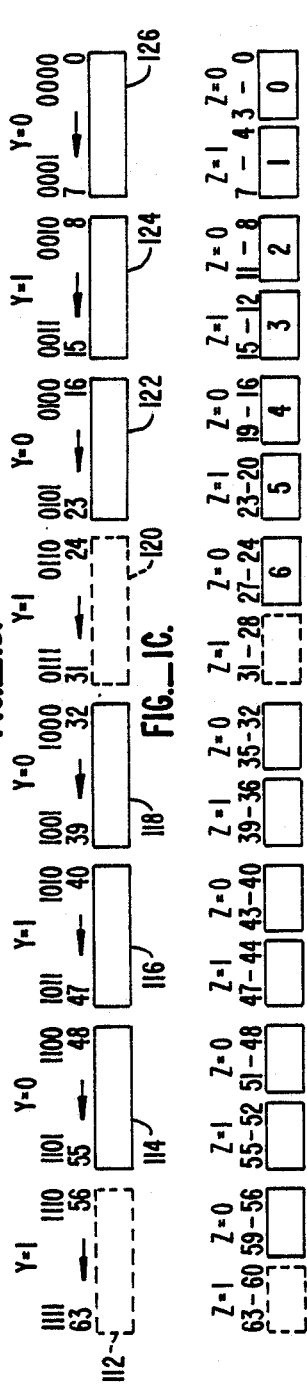
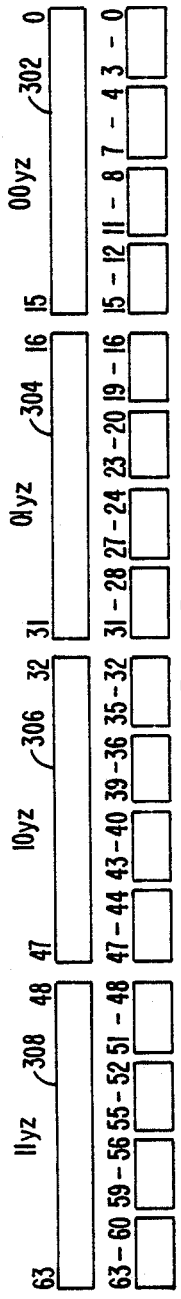
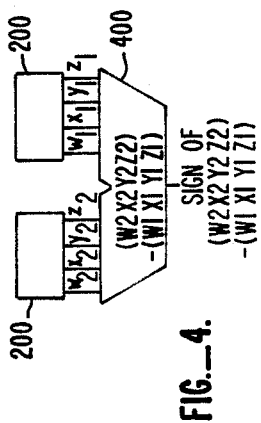

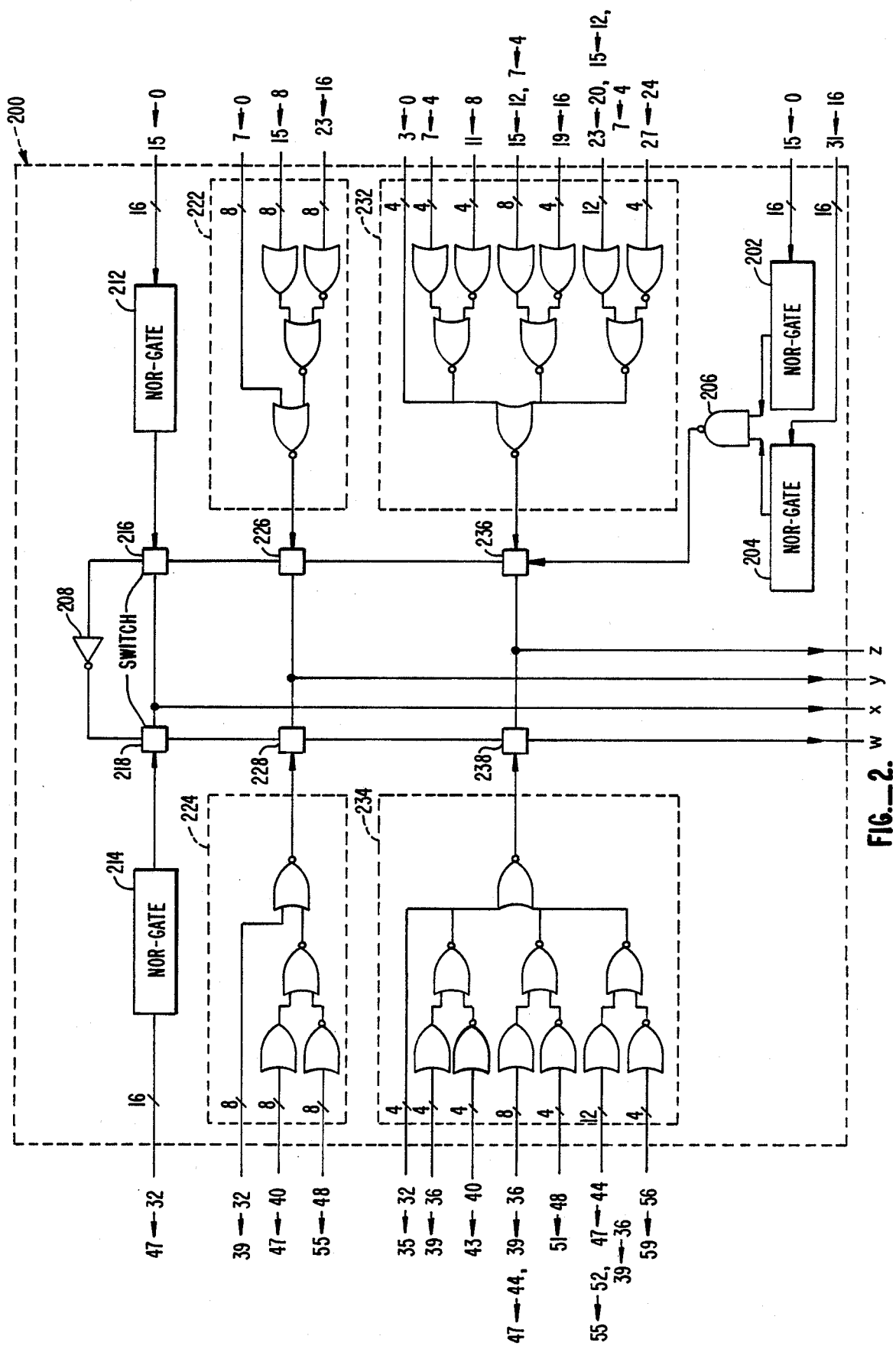
FIG._2.

CIRCUIT FOR DETECTING TRAILING ZEROS IN NUMBERS

BACKGROUND OF THE INVENTION

This invention is related in general to computing circuitry and in particular to circuits for detecting trailing zeros in numbers.

In performing numerical computations it is frequently necessary to multiply two numbers. One or both numbers to be multiplied may contain a number of trailing zeros. This is most common in floating point arithmetic where a number is represented in three parts: a sign bit indicating whether the number is positive or negative, an exponent and a fraction portion of the number. The fraction portion is usually normalized by shifting the fraction to the left so that the most significant bit of the fraction portion is non-zero. If the non-zero part of the fraction portion is short compared to the length of the fraction portion, the portion will contain many trailing zeros. When two numbers are multiplied the exponent portions of the two numbers in floating point format are added. The fraction portions of the two numbers are then multiplied. If the fraction portion of the multiplier contains a long string of trailing zeros, a large number of multiplication steps would be required to multiply the respective zero portions. This seriously slows down the operation of the computing system.

In conventional multiplier systems, where two numbers to be multiplied are not represented in floating point format, multiplication steps would still be necessary to multiply the multiplicand by the zero portion of the multiplier. It is therefore desirable to provide circuitry for detecting trailing zeros of numbers to be multiplied so that the zero portions of such numbers may be skipped over.

In U.S. Pat. No. 4,276,607 Wong discloses a multiplier circuit for detecting and skipping over trailing zeros of the multiplier. In Wong's system a floating point number of 64 bits in length is represented by concatenating four words together each 16 bits long. The four words are supplied sequentially to a register and a non-zero detector at the same time. When a particular word is detected to contain at least one non-zero bit the word number corresponding to the non-zero word is registered in the register. The lowest order word among the four words having non-zero content is determined.

In Wong's multiplier circuit, the non-zero content of the words of each number is determined sequentially which requires a significant amount of time which may offset a significant portion of the time saved by skipping over trailing zeros in the multiplier. Thus, Wong's system as disclosed in U.S. Pat. No. 4,276,607 is not entirely satisfactory.

SUMMARY OF THE INVENTION

The system of this invention is for detecting the presence of trailing zeros in a number. The number is divided into a plurality of consecutive groups, each group having an address. The system also determines the address location of the lowest order group which contains at least one non-zero bit and which precedes any trailing zeros of the number. Such group defines a target group. The system includes a first circuit for dividing the number into a plurality of consecutive words where each word contains more bits than any group. The first circuit also determines the lowest order word which contains one or more non-zero bits and which precedes any trailing zeros of the number. The system includes a second dividing and determining circuit for dividing each word into a plurality of segments each having a number of bits equal to or greater than the number of bits in the target group. The second circuit determines, for each word, the lowest order segment which contains one or more non-zero bits and which precedes any trailing zeros of such word. The first and second circuits perform the determination substantially simultaneously to reduce the amount of time for determining the address of the target. The system further includes circuit for determining, from the lowest order word and segment determined by the first and second circuits, the address of the target group.

BRIEF DESCRIPTION OF THE DRAWINGS

FIGS. 1A, 1B, 1C and 1D are schematic views of a number divided into words of different lengths to illustrate the scheme of the preferred embodiment of the invention.

FIG. 2 is a schematic diagram of a circuit for detecting trailing zeros and for determining the address location of the 4-bit group containing the lowest order non-zero bit preceding any trailing zeros of a number to illustrate the preferred embodiment of the invention.

FIG. 3 is a schematic view of a number divided into words to illustrate the scheme of an alternative embodiment of the invention.

FIG. 4 is a block diagram of a circuit for choosing, from two operands, the one with more trailing zeros.

DETAILED DESCRIPTION OF THE PREFERRED EMBODIMENT

FIGS. 1A, 1B, 1C and 1D are schematic views of a number divided into words of different lengths to illustrate the scheme of the preferred embodiment of the invention for detecting the non-zero content of the words. For the purpose of illustration the number contains 64 bits, namely bit 0 to bit 63. The system of the invention employs radix 16 so that the 64 bit number is processed in groups of 4 bits each, namely, groups of bits 0-3, 4-7, 8-11, . . . , 52-55, 56-59 and 60-63. It will be understood, however, that the invention is applicable to numbers other than 64 bits in length and to computing systems employing a radix other than 16 which may for example be 8. such case the bits of the number will be processed in groups of three.

When two 64 bit numbers are multiplied in a multiplier circuit, the two numbers are called the two operands. The operand which is used to multiply the other operand is called the multiplier and the other operand the multiplicand. Since the same product will be obtained irrespective of which operand is chosen as the multiplier, either operand may be selected as the multiplier. The system of the invention detects substantially simultaneously the presence of trailing zeros in both operands and determines which operand has more trailing zeros so that such operand can be chosen as the multiplier. In addition, the system of the invention detects the location of the first non-zero bit in each operand so that the trailing zeros in the multiplier may be skipped over to speed up the multiplication process.

As described above, the preferred embodiment of the invention processes 64 bit numbers in groups of 4 bits each. Thus, instead of determining the exact address of the first non-zero bit preceding any trailing zeros in each 64 bit operand, it is sufficient in the preferred embodiment to determine the address of the lowest order 4 bit group which contains such first non-zero bit in each operand. Such 4 bit group will be referred to below as the target 4 bit group of the particular operand. The same scheme may be applied to both operands to determine the addresses of the target 4 bit groups in both operands. Then the two addresses are compared to determine which operand contains the more trailing zeros. Such operand may be chosen as the multiplier.

Since identical schemes may be applied to both operands to determine the addresses of the target 4 bit groups, the scheme of the preferred embodiment will be described below only for one of the two operands, with the understanding that a similar scheme may be applied to the other operand. As shown in FIGS. 1A-1D, the higher order half of the 64 bit number containing bits 32-63 is treated separately from the lower order half containing bits 0-31. The 64 bit number is divided into 4 words of 16 bits each: 102, 104, 106 and 108. The 4 words each contains four 4 bit groups. The two 16 bit words 106, 108 containing bits 0-15, 16-31 are examined to determine if either one or both words contain any non-zero bits. If either one or both words contain at least one non-zero bit then the target 4 bit group must be contained in either one of the two words. If both words are found to contain all zeros, however, then the target 4 bit group must be contained in words 102 or 104, assuming that the 64 bit number is not zero. The above procedure forms the first path of decision illustrated by the four 16 bit words in FIG. 1A, where words 102 and 104 are shown in phantom since examination of bits 32-63 is not necessary in this first path.

A 64 bit number contains a total of sixteen 4 bit groups identified above. The 4 bit groups may be addressed from right to left consecutively from 0 to 15. The preferred embodiment of the invention is used to determine which of the 16 groups is the target 4 bit group. In other words, the preferred embodiment of the invention may be used to determine the address of the target 4 bit group which will range from 0 to 15. When expressed in binary form, the address of the target 4 bit group will be a 4 bit number represented by W X Y Z. The addresses of all sixteen 4 bit groups are shown in FIG. 1C. If in the first path of decision in reference to FIG. 1A, words 106 and 108 containing bits 0-31 are detected to contain a non-zero bit, then the most significant bit W of the address of the target 4 bit group will be a "0". If the two 16 bit words are detected to contain all zeros so that the target 4 bit group is in the higher order half of the 64 bit number, then bit W of the address of the target 4 bit group will be a "1". Thus, the first path will yield the most significant bit W of the address of the target 4 bit group.

To determine the remaining bits X, Y and Z of the address of the target 4 bit group three more paths will be required. To reduce the amount of time required to determine the address, the three additional decision paths and the first decision path will be parallel so that the four variables W, X, Y and Z are determined substantially simultaneously. In the preferred embodiment, each half of the 64 bit operand are examined substantially simultaneously and in parallel by two sets of similar logic circuits to provide the values of X, Y and Z. Of the two sets of logic circuits, only the one examining the half of the operand containing the target 4 bit group will provide the correct values of X, Y and Z. The value of W determined by the first decision path is used to select the values of X, Y and Z provided by the logic circuit that examines such half of the operand. The three additional decision paths are described below.

In the second path for determining X in reference to FIG. 1B, the two 16 bit words 104 and 108 containing bits 32-47 and 0-15 are examined by two parallel logic circuits 212, 214 of FIG. 2. If word 108 is detected to contain all zeros, and if, in the first path W is determined to be "0", then the target 4 bit group is contained in the word 106 and X is therefore equal to "1". If in the first path bits 0-31 are all zeros and in the second path word 104 is detected to contain a non-zero bit then W is 1 and X is 0. Thus the first and second paths together will yield the values of W and X. The first and second paths are in parallel so that the values of W and X are determined substantially simultaneously. In the second path only words 104 and 108 are examined. Therefore, words 102 and 106 are shown in phantom in FIG. 1B.

In the third path in reference to FIG. 1C, three 8 bit words 114, 116, 113 are examined for their non-zero content by logic circuit 224 of FIG. 2 and three 8 bit words 122, 124 and 126 are examined for their non-zero content by logic circuit 222 in parallel with circuit 224 to determine the value of Y. The third path is in parallel to the first and second decision paths so that X, Y and W are determined substantially simultaneously. Since the bits 24-31 and 56-63 are not examined in the third path, the 8 bit words 112 and 120 are shown in phantom. Similarly, in the fourth path parallel logic circuits 232, 234 are used to examine the non-zero content of bits 0-27 and 32-59 to determine the value of Z. Again, the fourth path is in parallel with the first, second and third paths so that all four variables, W, X, Y and Z are determined substantially simultaneously. The logic circuit 200 for implementing the four paths will now be explained in detail in reference to FIG. 2.

FIG. 2 is a schematic diagram of a circuit 200 for implementing the four decision paths illustrated in FIGS. 1A-1D to find the address of the target 4 bit group. In the first path, the contents of bits 0-15 and bits 16-31 are supplied to NOR-gate 202 and 204. The outputs of the two NOR-gates 202 and 204 are applied to the two inputs of a NAND-gate 206. The output of the NAND-gate 206 is inverted by an inverter 208, the output of which being W. Thus, if bits 0-31 are all zeros both NOR-gates 202 and 204 will provide high outputs causing NAND-gate 206 to provide a low output or a "0" which is inverted by inverter 208 so that W is equal to "1". If bits 0-31 contain one or more non-zero bits at least one of the two NOR-gates 202 or 204 will provide a low output, causing NAND-gate 206 to provide a high output. This is in turn inverted by inverter 208 to give W the value of "0". Thus, in the first path NOR-gate 202 is used to examine the non-zero content of word 108 containing bits 0-15 in reference to FIG. 1, and NOR-gate 204 is used to examine the non-zero content of word 106 containing the bits 16-31. The above-described logic path thus yields the value of W by examining words 106 and 108 of FIG. 1A.

In the second path, NOR-gates 212 and 214 are used to examine words 108 and 104 of FIG. 1B. Thus, the contents of bits 0-15 are supplied to NOR-gate 212. If these bits are all zero, NOR-gate 212 will give a high output or a logic "1" output. Similarly, if bits 32-47 are all zero NOR-gate 214 will supply a high output or logic "1" output. The outputs of NOR-gates 212, 214 both being "1" indicates that the target 4 bit group is contained in bits 16-31 or bits 48-63. In other instances, bits 0-15 and/or bits 32-47 may contain the 4 bit target group so that one or both of NOR-gate's 212 and 214 will provide a low output or logic "0" output for the value. If the target 4 bit group is contained in bits 0–15 and bits 32–47 happen to be all zero, the output of NOR-gate 212 will provide the correct value for X, namely "0", and the output of NOR-gate 214 will provide an incorrect value for X, namely "1". In general, where the target 4 bit group is contained in bits 0–31, the output of NOR-gate 212 will provide the correct value of X; where the target 4 bit group is contained in bits 32–63, NOR-gate 214 will provide the correct value. The value of W determined in the first decision path is then used to select between the outputs of NOR-gates 212, 214 to give the correct value of X, as described below.

If in the first path the target 4 bit group is determined to be within the lower half of the 64 bit number (that is, contained in bits 0–31) so that W is "0", the output of NOR-gate 212 will be selected to be the value of X. If, however, the target 4 bit group is determined to be contained in bits 32–63 the output of NOR-gate 214 will be selected. This is accomplished by two switching elements 216 and 218. In the preferred embodiment, these may be two FETs with the output of NAND-gate 206 controlling their gates. As described above, if the lower half of the 64 bit number contains the target 4 bit group, NAND-gate 206 will provide a high output voltage which is applied to element 216, causing it to be switched on. Inverter 208 inverts the output of NAND-gate 206 so that a low output voltage is applied to element 218, causing it to be switched off. This causes the output of NOR-gate 212 to be selected for the value of X. If on the other hand the target 4 bit group is determined to be in the upper half of the number so that bits 0–31 are all zero, NAND-gate 206 will provide a low output causing element 216 to be switched on and element 218 to be switched off so that the output of NOR-gate 214 will be selected for the value of X. In such manner the results of the determination in the first and second paths are combined to select the value of X. It will be understood that other logic circuits different from circuits 212, 214 may also be used for determining the value of X and are within the scope of this invention.

The third path will now be described in reference to logic circuits 222 and 224 and the 8 bit words 112–126 of FIG. 1C and the following truth table.

| (48–55) 16–23 | (40–47) 8–15 | (32–39) 0–7 | Y |
| --- | --- | --- | --- |
| A | A | 1 | 0 |
| A | 1 | 0 | 1 |
| 1 | 0 | 0 | 0 |
| 0 | 0 | 0 | 1 |

In the above truth table, an "A" means the value of Y will be unaffected irrespective of whether A is "1" or "0". An entry "0" in the above table underneath an 8 bit word means that all 8 bits in such word are zero, and an entry "1" in the above table underneath an 8 bit word means that at least one of the 8 bits in such word is a "1". Referring to the fourth line in the above table, if all the bits 0–23 are 0 and the target 4 bit group has been determined by the first path to be contained within bits 0–31 then the 4 bit target group is contained in bits 24–31, that is word 120. The address of such target 4 bit group is therefore either 0110 or 0111. In either case the value of Y is 1. For the next possibility in reference to the top line of the table, bits 0–7 contains one or more none-zero bits. Irrespective of the values of bits 8–23, the 4 bit target group is contained by word 126 so that its address is 0000 or 0001. In either case the value of Y is 0. In a similar manner the value of Y can be determined as a function of the different input values for the bits 0–23 provided that in the first path the 4 bit target group has been determined to be contained within bits 0–31. Similar to the first and second paths, examination of certain bits, in this case bits 24–31, is not necessary. If the target 4 bit group has been determined by the first path to be in bits 32–63 the value of Y can be determined in a similar manner by using the above truth table in reference to the bit numbers within parenthesis.

In the preferred embodiment illustrated in FIG. 2 the logic circuits 222 and 224 are identical and they implement the logic of the above truth table to select the proper value of Y depending on the values of the input bits. It will be understood, however, that circuits 222, 224 need not be identical and other logic circuits may also be used for implementing the truth table for the value of Y and are within the scope of this invention. Logic circuits 222 and 224 provide the value of Y for selection by the output of NAND-gate 206 through switching elements 226, 228 in a manner similar to the selection of the value of X described above. Thus, if the 4 bit target group has been determined by the first path to be contained within bits 0–31 the output of logic circuit 222 will be selected to be the value of Y. If, however, the target 4 bit group has been determined by the first path to be contained within bits 32–62 the output of logic circuit 224 will be selected instead to be the value of Y.

In reference to FIGS. 1D and 2, bits 0–27 and 32–59 are examined by logic circuits 232 and 234 respectively to provide the value of Z. Similar to the determination of Y in the third path, the logic circuits implement the following truth table:

| (59–56) 27–24 | (55–52) 23–20 | (51–48) 19–16 | (47–44) 15–12 | (43–40) 11–8 | (39–36) 7–4 | (35–32) 3–0 | Z |
| --- | --- | --- | --- | --- | --- | --- | --- |
| A | A | A | A | A | A | 1 | 0 |
| A | A | A | A | A | 1 | 0 | 1 |
| A | A | A | A | 1 | 0 | 0 | 0 |
| A | A | A | 1 | 0 | 0 | 0 | 1 |
| A | A | 1 | 0 | 0 | 0 | 0 | 0 |
| A | 1 | 0 | 0 | 0 | 0 | 0 | 1 |
| 1 | 0 | 0 | 0 | 0 | 0 | 0 | 0 |
| 0 | 0 | 0 | 0 | 0 | 0 | 0 | 1 |

In the above truth table, "A" underneath a 4 bit group means that the corresponding value of Z is the same irrespective of the values of the four bits in such group. A "0" underneath a 4 bit group means that all four bits in such group are 0. A "1" underneath a 4 bit group means that at least one of the four bits in such group is a 1. The above truth table is drawn up for the value of Z in a manner similar to that for the value of Y. Logic circuits 232 and 234 may then be constructed to implement the truth table for selecting the proper value of Z as a function of the values of their inputs. One particular implementation of the circuits 232 and 234 are shown on FIG. 2. It will be understood, however, that other logic circuits may also be used for implementing the truth table for the value of Z and are within the scope of this invention. Similar to the second and third paths, two switching elements 236, 238 enable the correct value of Z to be selected from the outputs of logic circuits 232, 234 by the output from NAND-gate 206.

The second, third and fourth paths for determining the values of X, Y and Z process the values of the various input bits of the 64 bit number at the same time when the first path is processing bits 0–31 to determine the value of W. Thus, the values of the outputs of NOR-gates 212, 214 and logic circuits 222, 224, 232 and 234 for determining the values of X, Y and Z are available for selection by the output of NAND-gate 206 at about the same time as when W is available from NAND-gate 206, so that W, X, Y and Z are determined substantially simultaneously. The processing of signals within each of the four paths is not dependent on the output or logic values within any other path except for the selections at the switching elements. Thus, the address (W X Y Z) of the target 4 bit group is determined with no excessive delay. When circuit 200 is used in a multiplier circuit to determine the address of the target 4 bit group, this can be performed quickly so that multiplication can begin by simply skipping over the trailing zeros and starting with the target 4 bit group to speed up the multiplication process.

In the preferred embodiment described above in reference to FIGS. 1A–1D and 2, the 64 bit number is divided into two equal halves and it is first determined whether the target 4 bit group is in the lower half or the upper half. Then, the two halves of 32 bits each are processed in parallel with the first path to determine where in the two halves that the target 4 bit group is located. It will be understood that other schemes for determining the location of the 4 bit target group may be used. One such scheme is illustrated in FIG. 3. As shown in FIG. 3, instead of dividing the 64 bit number into two halves, it is divided into four words of 16 bits each: 302, 304, 306 and 308. Logic circuits can be used to determine from the values of bits 0–47 in which of the words 302–308 that the target 4 bit group is located and determine the values of W and X in the address W X Y Z of the group. If the target 4 bit group is located in word 306, for example, then the values of W and X are 1 and 0 respectively. In the second decision path the four 16 bit words are each further broken down into four groups of four bits each. Logic circuits are utilized to determine from bits 0–11, 16–27, 32–43 and 48–59 to determine the location of the 4 bit target group within the four 16 bit words and the values for Y and Z. Four sets of logic circuits will then be necessary for selecting the results of the second path depending on the results of the first path. In the preferred embodiment on the other hand, only two sets of logic circuits are required for the selection. It will be understood that many other similar schemes and logic circuits may be used to determine the location of the target 4 bit group and are within the scope of this invention.

When two numbers are multiplied the same product will be obtained irrespective of which number is taken as the multiplier. To speed up the multiplication process it is desirable to designate as the multiplier the number which contains more trailing zeros. It is therefore advantageous to determine the number of trailing zeros in both operands and choose the operand with the more trailing zeros as the multiplier. As shown in FIG. 4, two circuits 200 of the type shown in FIG. 2 are used to determine the addresses of the target 4 bit groups of the two operands in the manner described above in reference to FIGS. 1A–1D, 2. The addresses of the two target 4 bit groups in the two operands are compared to determine which operand contains the more trailing zeros. Thus, if the address of the target 4 bit group in the first operand is (W1 X1 Y1 Z1), and the address of the target 4 bit group in the second operand is (W2 X2 Y2 Z2), then operand 2 has more trailing zeros if (W2 X2 Y2 Z2) is greater than (W1 X1 Y1 Z1). Which of the two operands contains the more trailing zeros is determined by a subtracter as illustrated in FIG. 4. Thus, (W2 X2 Y2 Z2) and (W1 X1 Y1 Z1) are supplied to the two inputs of the subtracter 400 which performs the subtraction (W2 X2 Y2 Z2)−(W1 X1 Y1 Z1). If the result of the subtraction is positive then the second operand contains more trailing zeros than the first operand so that the second operand may be selected as the multiplier. Conversely, if the result of the subtraction is negative then the first operand contains the more trailing zeros and may be selected advantageously as the multiplier. In either case the address of the target 4 bit group in each operand is already determined, so that after the multiplier is selected from the two operands, multiplication may begin by skipping the trailing zeros of the multiplier and starting with the target 4 bit group of the multiplier.

The circuit arrangement and system design described in the application are for illustrative purposes only and various changes in design and circuit arrangement and method used may be within the scope of the appended claims.

We claim:

1. A system for detecting the presence of trailing zeros in a number, said number being divisible into a plurality of consecutive groups, each group having an address, and said system also for determining the address location of the lowest order group which contains at least one non-zero bit and which precedes any trailing zeros of the number, defining a target group, said system comprising:

means for dividing the number into a plurality of consecutive words and for determining the lowest order word which contains one or more non-zero bits and which precedes any trailing zeros of the number, said words each containing more bits than any group;

means for dividing each word into a plurality of consecutive segments each having a number of bits greater than or equal to the number of bits in the target group, and for determining, for each word, the lowest order segment which contains one or more non-zero bits and which precedes any trailing zeros of such word, and wherein the determination of said lowest order segment is substantially concurrent with the determination of said lowest order word to reduce the amount of time for determining the address of said target group;

means for determining, from said lowest order word and segments, the address of said target group, wherein each segment contains more bits than the target group and contains a plurality of groups of bits; and means for dividing each segment into a plurality of consecutive subsegments each containing a plurality of consecutive groups and for determining (a) for each segment, the lowest order subsegment which contains at least one non-zero bit and which precedes any trailing zeros of such segment, and (b) for each subsegment, the lowest order group which contains at least one non-zero bit and which precedes any trailing zeros of such subsegment, and wherein the determination of said lowest order word, segments, subsegments and groups are performed substantially concurrently to determine the address of said target group.

2. The system of claim 1, wherein each segment is divisible into a plurality of subsegments, said system further comprising means for dividing each word into a plurality of consecutive subsegments each containing a plurality of consecutive groups and for determining (a) for each word, the lowest order subsegment which contains at least one non-zero bit and which precedes any trailing zeros of such word, and (b) for each word, the lowest order group which contains at least one non-zero bit and which precedes any trailing zeros of such word.

3. The system of claim 2, wherein said number has 16n bits, each word 4n bits, each segment 2n bits, each subsegment n bits and each group n bits, where n is a positive integer.

4. The system of claim 3, wherein n is 4.

5. The system of claim 1, wherein the number is a 4n bit number, where n is a positive integer, each word containing 2n bits, each group containing n bits and each segment containing n bits.

6. The system of claim 5, wherein n is 16.

7. The system of claim 5, wherein each word contains two segments.

8. A system for use with a multiplier system for detecting the presence of trailing zeros in the two operands to be multiplied by the multiplier and for determining which of the two operands has the more trailing zeros, said system comprising:
means for determining the location of the lowest order non-zero bit preceding trailing zeros of each of the two operands, if any; and
means for comparing the locations of said lowest order non-zero bits of the two operands to determine which of the two operands contains the more trailing zeros.

9. The system of claim 8, wherein the system employs a predetermined number as its radix, wherein each of the two operands is divisible into a plurality of consecutive groups of equal number of bits, each group of one operand containing the same number of bits as each of those of the other operand, said number of bits being commensurate with the radix, each group of each operand having an address, wherein said determining means determines the location of the lowest order non-zero bit preceding trailing zeros of each operand by determining the address of the lowest order group in such operand which contains at least one non-zero bit and which precedes any trailing zeros of such operand defining the target group of such operand, and wherein said comparing means compares the locations of said lowest order non-zero bits by comparing the addresses of the target groups of the two operands, the operand whose target group having a higher address being the operand with the more trailing zeros.

10. The system of claim 9, wherein the determining means determines the addresses of the target groups of the two operands substantially concurrently.

11. The system of claim 10, wherein the determining means comprises:
means for dividing each operand into a plurality of consecutive words and for determining the lowest order word which contains one or more non-zero bits and which precedes any trailing zeros of such operand, said words each containing more bits than each group;
means for dividing each word into a plurality of consecutive segments each having a number of bits greater than or equal to the number of bits in the target group, and for determining, for each word, the lowest order segment which contains one or more non-zero bits and which precedes any trailing zeros of such word, and wherein the determination of said lowest order segment is substantially concurrent with the determination of said lowest order word to reduce the amount of time for determining the location of the target group of such operand; and
means for determining, from said lowest order word and segments, the address of said target group of such operand.

12. The system of claim 11, wherein each segment of each operand is divisible into a plurality of subsegments, said system further comprising means for dividing each word of each operand into a plurality of consecutive subsegments each containing a plurality of consecutive groups and for determining (a) for each word of each operand, the lowest order subsegment which contains at least one non-zero bit and which precedes any trailing zeros of such word, and (b) for each word of each operand, the lowest order group which contains at least one non-zero bit and which precedes any trailing zeros of such word and wherein the determination of said lowest order word, segments, subsegments and groups are performed substantially concurrently to determine the address of said target group of each operand.

13. The system of claim 12, wherein each operand has 16n bits, each word 8n bits, each segment 4n bits, each subsegment 2n bits and each group n bits, where n is a positive integer.

14. The system of claim 13, wherein n is 4.

15. The system of claim 10, wherein the determining means provides to the comparing means the addresses of the target groups of the two operands for comparison, and wherein the comparing means is a subtracter for subtracting the address of the target group of the first operand from that of the target group of the second operand, so that a positive difference indicates that the second operand has more trailing zeros, and a negative remainder indicates that the first operand has more trailing zeros, and so that the operand with the more trailing zeros is selectable by the multiplier system to be the multiplier.

16. The system of claim 15, further comprising means providing the address of the target group of the multiplier having more trailing zeros to the multiplier system for skipping over the trailing zeros of the multiplier.

17. The system of claim 8, wherein the determining means determines the locations of the lowest order non-zero bits of the two operands substantially concurrently.

* * * * *